(12) United States Patent
Hilligoss et al.

(10) Patent No.: US 11,557,796 B2
(45) Date of Patent: Jan. 17, 2023

(54) DC-DC-CONVERTER-BASED ACTIVE VOLTAGE-BALANCING SYSTEM AND METHOD FOR PARALLEL BATTERY PACKS

(71) Applicant: Cummins Inc., Columbus, IN (US)

(72) Inventors: Lawrence Hilligoss, Ashland, OR (US);
Nitisha Manchanda, Indore (IN);
Minyu Cai, Fridley, MN (US)

(73) Assignee: CUMMINS INC., Columbus, IN (US)

( * ) Notice: Subject to any disclaimer, the term of this patent is extended or adjusted under 35 U.S.C. 154(b) by 50 days.

(21) Appl. No.: 16/930,749

(22) Filed: Jul. 16, 2020

(65) Prior Publication Data
US 2021/0028503 A1 Jan. 28, 2021

Related U.S. Application Data

(60) Provisional application No. 62/877,356, filed on Jul. 23, 2019.

(51) Int. Cl.
*H01M 10/42* (2006.01)
*B60L 58/22* (2019.01)
*H02M 3/158* (2006.01)

(52) U.S. Cl.
CPC ........... *H01M 10/425* (2013.01); *B60L 58/22* (2019.02); *H02M 3/1582* (2013.01);
(Continued)

(58) Field of Classification Search
CPC ........ H01M 10/425; H01M 2010/4271; B60L 58/22; B60L 2210/14; B60L 2210/12; H02M 3/1582
(Continued)

(56) References Cited

U.S. PATENT DOCUMENTS 8,183,870 B1 * 5/2012 Davies .............. H01M 10/4207
323/248
8,310,203 B2 11/2012 Wu
(Continued)

FOREIGN PATENT DOCUMENTS

| WO | 2010093186 A2 | 8/2010 |
| WO | 2011113735 A2 | 9/2011 |
| WO | 2014007996 A2 | 1/2014 |

*Primary Examiner* — Bryce M Aisaka
(74) *Attorney, Agent, or Firm* — Faegre Drinker Biddle & Reath LLP (57) ABSTRACT

The present disclosure provides a circuit for balancing voltages of battery packs to be connected in parallel, comprising: IN-side switches and OUT-side switches; a DC-DC converter with an IN terminal connected to the IN-side switches and an OUT terminal connected to the OUT-side switches; and a controller to operate an IN-side switch to connect a $V_{max}$ battery pack to the IN terminal, operate an OUT-side switch to connect a $V_{min}$ battery pack to the OUT terminal, and activate the DC-DC converter to transfer energy from the $V_{min}$ battery pack to the $V_{min}$ battery pack. The controller responds to an IN terminal voltage being sufficiently close to a voltage of a first battery pack by operating an IN-side switch to connect the first pack to the IN terminal, and responds to an OUT terminal voltage being sufficiently close to a voltage of a second battery pack by operating an OUT-side switch to connect the second battery pack to the OUT terminal.

20 Claims, 6 Drawing Sheets

(52) U.S. Cl.
CPC ....... *B60L 2210/12* (2013.01); *B60L 2210/14* (2013.01); *H01M 2010/4271* (2013.01)

(58) Field of Classification Search
USPC ........................................................ 320/137
See application file for complete search history.

(56) References Cited

U.S. PATENT DOCUMENTS

| | | | |
|---|---|---|---|
| 8,384,352 B2 | 2/2013 | Shiu | |
| 9,166,416 B2 * | 10/2015 | Gerlovin | H02J 7/0019 |
| 9,166,437 B2 | 10/2015 | Hamburgen | |
| 10,305,298 B2 * | 5/2019 | Kristensen | H02J 7/0016 |

\* cited by examiner

DC-DC-CONVERTER-BASED ACTIVE VOLTAGE-BALANCING SYSTEM AND METHOD FOR PARALLEL BATTERY PACKS

CROSS-REFERENCE TO RELATED APPLICATIONS

The present application claims priority to U.S. Provisional Application Ser. 62/877,356, filed Jul. 23, 2019, the entire disclosure of which being expressly incorporated herein by reference.

FIELD OF THE DISCLOSURE

The present disclosure generally relates to energy storage systems and in particular to systems and methods for actively balancing the voltage of battery packs to be connected in parallel in an energy storage system using DC-DC converters.

BACKGROUND OF THE DISCLOSURE

Battery packs used in applications such as electric vehicles, hybrid electric vehicles and other devices and equipment powered at least partially by stored electricity can be connected in parallel to provide increased travel range, power redundancy and other desirable operational characteristics. One known challenge when using high-voltage parallel battery packs, however, is the need to balance the voltage of the packs, particularly when the battery packs are being brought on line such as after the vehicle or equipment was powered down. Any significant difference in the battery pack voltages results in large balancing currents when the packs are connected, which may reduce the useful life of the battery packs and/or contactors or other circuitry connected to the battery packs. Thus, an approach for addressing the potential damage caused by unbalanced parallel battery pack voltages is needed.

Conventional systems employ various approaches for avoiding the problem outlined above. For example, some systems identify the battery packs in the group of parallel packs that have small voltage differences and connect those battery packs to a common bus in a certain sequence. This approach relies on the internal resistances of the battery packs to limit the balancing current. Additionally, only the battery packs with small voltage differences can be balanced. Some battery packs will be kept off-line. In another approach, the battery pack voltages of the group of battery packs is balanced during charging using an external power source, or during discharging to an external load. This approach, however, requires the use of an external power source or an external load, which limits where and when a voltage balancing can be performed. Finally, in another approach all of the battery packs are connected in parallel when the energy storage system is off-line. This, however, results in an energy storage system with battery packs having live terminals during off-line periods. When high-voltage battery packs are used, this approach presents potential safety risks.

As such, there exists a need to provide an approach to actively balance voltages of battery packs to be connected in parallel in energy storage systems to prevent damage to the system without relying on an external source or load or presenting safety concerns.

SUMMARY

According to one embodiment, the present disclosure provides a balancing circuit for actively balancing voltages of battery packs to be connected in parallel, comprising: IN-side switches; OUT-side switches; a DC-DC converter having an IN terminal connected to the IN-side switches and an OUT terminal connected to the OUT-side switches; and a controller configured to operate an IN-side switch to connect a $V_{max}$ battery pack having a highest voltage of the battery packs to the IN terminal, operate an OUT-side switch to connect a $V_{min}$ battery pack having a lowest voltage of the battery packs to the OUT terminal, and activate the DC-DC converter to transfer energy from the $V_{max}$ battery pack to the $V_{min}$ battery pack; wherein the controller is further configured to respond to an IN terminal voltage being sufficiently close to a voltage of a first battery pack by operating an IN-side switch to connect the first battery pack to the IN terminal, and respond to an OUT terminal voltage being sufficiently close to a voltage of a second battery pack by operating an OUT-side switch to connect the second battery pack to the OUT terminal. In one aspect of this embodiment, when all of the battery packs are connected to the DC-DC converter, the controller is configured to respond to a voltage difference among the battery packs being sufficiently small by stopping operation of the DC-DC converter. In a variation of this aspect, the controller is further configured to respond to a voltage difference among the battery packs being sufficiently small by opening the OUT-side switches and closing the IN-side switches to connect the battery packs to the IN terminal, closing one or more system DC-bus contactors, operating the DC-DC converter to pre-charge the system DC bus, discontinue operating the DC-DC converter, and connecting the battery packs to the system DC bus. In another aspect, the DC-DC converter is one of a buck converter or a buck-boost converter. In still another aspect, the controller is configured to rank voltages of the battery packs from highest to lowest or from lowest to highest.

According to another embodiment, the present disclosure provides a method of pre-charging a system DC bus coupled to a plurality of battery packs to be connected in parallel, comprising: ranking the plurality of battery packs in order of voltage; connecting a first battery pack with the highest voltage to an IN terminal of a DC-DC converter; connecting a second battery pack with the lowest voltage to an OUT terminal of the DC-DC converter; converting energy from the first battery pack to the second battery pack through the DC-DC converter; connecting a third battery pack to the IN terminal in response to a voltage of the third battery pack being within a first threshold voltage difference of a voltage of the IN terminal; connecting a fourth battery pack to the OUT terminal in response to a voltage of the fourth battery pack being within a second threshold voltage difference of a voltage of the OUT terminal; and when the voltages of all of the battery packs are within a third threshold voltage difference of one another, connecting all of the battery packs to the IN terminal and connecting the OUT terminal to the system DC bus to pre-charge the system DC bus. In one aspect of this embodiment, connecting a first battery pack with the highest voltage to an IN terminal of a DC-DC converter includes operating a controller to close an IN-side switch connected between the first battery pack and the IN terminal. In another aspect, connecting a second battery pack with the lowest voltage to an OUT terminal of the DC-DC converter includes operating a controller to close an OUT-side switch connected between the second battery pack and the OUT terminal.

In yet another embodiment, the present disclosure provides an energy storage system, comprising: a plurality of battery packs to be connected in parallel; a balancing circuit coupled to the plurality of battery packs; and a pair of contactors coupled to the balancing circuit to connect the plurality of battery packs to a system DC bus; wherein the balancing circuit includes a DC-DC converter having an IN terminal and an OUT terminal, a plurality of IN-side switches connected between the plurality of battery packs and the IN terminal, a plurality of OUT-side switches connected between the plurality of battery packs and the OUT terminal, and a controller having a memory with instructions that when executed, cause the controller to control the IN-side switches and the OUT-side switches to connect a battery pack having the highest voltage to the IN terminal, connect a battery pack having the lowest voltage to the OUT terminal, connect any remaining battery pack to the IN terminal in response to a voltage of the remaining battery pack being sufficiently close to a voltage of the IN terminal, and connect any remaining battery pack to the OUT terminal in response to a voltage of the remaining battery pack being sufficiently close to a voltage of the OUT terminal. In one aspect of this embodiment, the controller is further configured to respond to the voltages of the plurality of battery packs being balanced through operation of the DC-DC converter by connecting the battery packs to the IN terminal, closing system DC-bus contactors, and using the DC-DC converter to pre-charge a system DC bus. In another aspect, the DC-DC converter is one of a buck converter or a buck-boost converter. In still another aspect of this embodiment, the controller is configured to rank voltages of the battery packs from highest to lowest or from lowest to highest.

In another embodiment, the present disclosure provides a balancing circuit for actively balancing voltages of a plurality of battery packs to be connected in parallel, comprising: a plurality of DC-DC converters corresponding to the plurality of battery packs, each having an IN terminal and an OUT terminal; a plurality of bypass switches, each connected between an IN terminal and an OUT terminal of a respective one of the plurality of DC-DC converters; and a controller configured to connect a battery pack having a lowest voltage to the OUT terminal, operate one or more DC-DC converters corresponding to one or more higher-voltage battery packs having initial voltages greater than an average battery pack voltage ($V_{ave}$) to charge the OUT terminal, connect one or more lower-voltage battery packs having initial voltages less than $V_{ave}$ to the OUT terminal when the initial voltage of a lower-voltage battery pack is sufficiently close to a current voltage of the OUT terminal, and deactivate a DC-DC converter corresponding to a higher-voltage battery pack when a current voltage of the corresponding higher-voltage battery pack is sufficiently close to $V_{ave}$. In one aspect of this embodiment, the controller is further configured to respond to all lower-voltage battery packs being connected to the OUT terminal and all higher-voltage battery packs being sufficiently close to $V_{ave}$ by disconnecting all battery packs from the OUT terminal, closing system DC-bus contactors, and pre-charging a system DC bus with one or more of the DC-DC converters. In a variant of this aspect, the controller is further configured to respond to completion of pre-charging the system DC bus by discontinuing operation of the one or more DC-DC converters, and connecting all of the battery packs to the system DC bus through the plurality of bypass switches.

In yet another embodiment, the present disclosure provides a method of pre-charging a system DC bus coupled through a DC bus contactor to a plurality of battery packs to be connected in parallel, comprising: ranking the plurality of battery packs in order of voltage; calculating an average battery pack voltage; identifying higher-voltage battery packs as battery packs of the plurality of battery packs having initial voltages that are greater than the average battery pack voltage; identifying lower-voltage battery packs as battery packs of the plurality of battery packs having initial voltages that are less than the average battery pack voltage; connecting a first battery pack with the lowest voltage to the DC bus contactor; activating DC-DC converters connected to the higher-voltage battery packs to provide energy to the DC bus contactor and increase the voltage of the first battery pack; connecting at least one lower-voltage battery pack to the DC bus contactor when an initial voltage of the at least one lower-voltage battery pack is sufficiently close to a current voltage of the DC bus contactor; and deactivating at least one DC-DC converter connected to a higher-voltage battery pack when a current voltage of the higher-voltage battery pack is sufficiently close to the current voltage of the DC bus contactor. One aspect of this embodiment further comprises disconnecting all of the plurality of battery packs from the DC bus contactor, connecting the DC bus contactor to a load and activating a DC-DC converter connected to one of the plurality of battery packs to pre-charge a system DC bus.

In still another embodiment, the present disclosure provides an energy storage system, comprising: a plurality of battery packs to be connected in parallel; and a balancing circuit coupled to the plurality of battery packs including a plurality of DC-DC converters corresponding to the plurality of battery packs, each DC-DC converter having an IN terminal and an OUT terminal, a plurality of bypass switches, each connected between an IN terminal and an OUT terminal of a DC-DC converter, and a controller having a memory with instructions that when executed, cause the controller to control the bypass switches to connect a battery pack having the lowest voltage to the OUT terminal, operate DC-DC converters associated with higher-voltage battery packs having initial voltages greater than an average battery pack voltage ($V_{ave}$) to charge the OUT terminal, connect lower-voltage battery packs having initial voltages less than $V_{ave}$ to the OUT terminal when the initial voltage of a lower-voltage battery pack is sufficiently close to a current voltage of the OUT terminal, and when a current voltage of a higher-voltage battery pack is sufficiently close to $V_{ave}$, deactivate a DC-DC converter corresponding to the higher voltage battery pack. In one aspect of this embodiment, the controller is further configured to respond to all lower-voltage battery packs being connected to the OUT terminal and the voltages of all higher-voltage battery packs being sufficiently close to $V_{ave}$ by disconnecting all battery packs from the OUT terminal, closing system DC-bus contactors, and pre-charging a system DC bus with one of the DC-DC converters. In a variant of this aspect, the controller is further configured to deactivate the one of the DC-DC converters, and connect all battery packs to the system DC bus through the bypass switches.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

As indicated above, battery packs to be connected in parallel may be used in various applications such as hybrid electric vehicles, stationary energy storage systems or other applications. Individual battery packs within a group of battery packs to be connected in parallel may have different voltages for various reasons. For example, a new, replacement battery pack may have a voltage that is different from the other battery packs in the group, or some existing battery packs may have been used more or less extensively than other existing battery packs in the group, resulting in different individual pack voltages. Connecting battery packs with significant voltage differences together may result in large balancing currents from higher-voltage battery packs to lower voltage battery packs which endangers the battery packs, their contactors and/or other equipment or circuitry.

The present disclosure provides voltage-balancing systems and methods that use a single or multiple DC-DC converter(s) to actively balance multiple battery packs so that they can be connected to a common DC bus in parallel without leaving un-faulted battery packs unused or risking having the large balancing currents mentioned above. Described at a high level for introduction, in the disclosed systems each battery pack can be connected to the input (IN) side and/or the output (OUT) side of a single or multiple DC-DC converter(s), or the pack can be disconnected. In general, the battery packs with higher voltages are connected to the IN side of the DC-DC converter(s), and the battery packs with lower voltages are connected to the OUT side of the DC-DC converter(s). The DC-DC converter(s) can control the balancing current from the IN side to OUT side, thereby discharging higher-voltage battery packs and charging lower-voltage battery packs until the voltage differences among the battery packs is below an acceptable threshold value, thereby preventing excessive currents when the packs are connected to a common DC bus.

Figure 1:
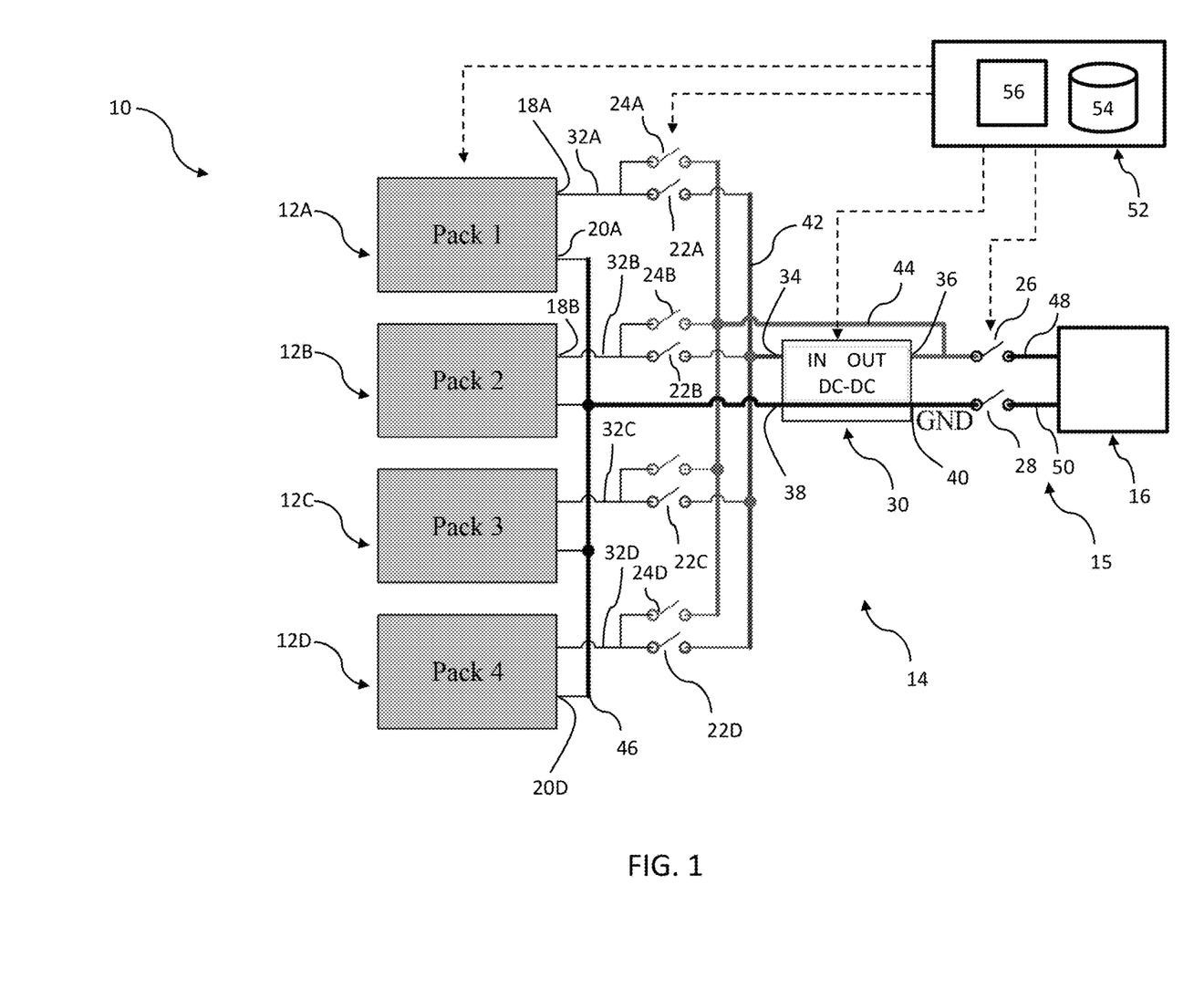
FIG. 1 is a schematic diagram of a parallel battery pack energy storage system with balancing circuitry according to one embodiment of the present disclosure.

Referring now to FIG. 1, an energy storage system 10 according to one embodiment of the present disclosure is shown. System 10 generally includes a plurality of battery packs 12A-12D coupled to a balancing circuit 14, which in turn is coupled to a system DC bus 15 connected to a load 16. While four battery packs 12A-12D are shown, it should be understood that more or fewer battery packs may be used for different applications. Battery packs 12A-12D may store electrical energy using any of a variety of different rechargeable cell technologies and materials. For example, battery packs 12A-12D may employ electrode materials and electrolytes such as lead-acid, nickel-cadmium, nickel-metal hydride, lithium-ion, or lithium-ion polymer, to name a few. Each battery pack 12A-12D includes a positive terminal 18A-18D and a negative terminal 20A-20D. In FIG. 1, load 16 represents the system that is powered by battery packs 12A-12D, which may be an electric machine or other type of equipment.

Balancing circuit 14 includes a plurality of IN-side switches 22A-22D, a plurality of OUT-side switches 24A-24D, a positive system DC-bus contactor 26, a negative system DC-bus contactor 28 and a single DC-DC converter 30. A terminal of IN-side switch 22A and a terminal of OUT-side switch 24A are each connected to positive terminal 18A of battery pack 12A through conductor 32A. Similarly, a terminal of IN-side switch 22B and a terminal of OUT-side switch 24B are each connected to positive terminal 18B of battery pack 12B through conductor 32B. Battery packs 12C and 12D are similarly connected to IN-side switches 22C and 22D and OUT-side switches 24C and 24D through conductors 32C and 32D, respectively.

DC-DC converter 30 may be any of a variety of suitable DC-DC converters known to those skilled in the art, such as a buck converter or a buck-boost converter. DC-DC converter 30 includes internal circuitry (not shown, but known in the art as potentially including power switches, diodes, inductors and capacitors), an IN terminal 34, an OUT terminal 36, a ground input 38 and a ground output 40. A terminal of each IN-side switch 22A-22D is connected to IN terminal 34 through conductor 42. A terminal of each OUT-side switch 24A-24D is connected to OUT terminal 36 through conductor 44. Each negative terminal 20A-20D of battery packs 12A-12D is connected to ground input 38 of DC-DC converter 30 through conductor 46. OUT terminal 36 is connected to positive contactor 26 which connects (when closed) the positive terminals 18A-18D of battery packs 12A-12D through conductor 44 (when OUT-side switches 24A-24D are closed) to positive conductor 48 of system DC bus 15, which in turn is connected to load 16. Ground output 40 of DC-DC converter 30 is connected to negative contactor 28 which connects (when closed) the negative terminals 20A-20D (through DC-DC converter 30) of battery packs 12A-12D to negative conductor 50 of system DC bus 15, which in turn is connected to load 16.

As indicated by dashed lines in FIG. 1, a controller 52 is in communication with battery packs 12A-12D, IN-side switches 22A-22D, OUT-side switches 24A-24D, DC-DC converter 30, positive system DC-bus contactor 26 and negative system DC-bus contactor 28. In certain embodiments, controller 52 may be a battery management unit (BMU) or other similar device or system, and may include a non-transitory memory 54 having instructions that, in response to execution by a processor 56, cause controller 52 to determine voltages of battery packs 12A-12D and control the operation of IN-side switches 22A-22D, OUT-side switches 24A-24D, DC-DC converter 30, positive contactor 26 and negative contactor 28 in the manner described herein.

Processor 56, non-transitory memory 54, and controller 52 are not particularly limited and can, for example, be physically separate. In certain embodiments, controller 52 can form a portion of a processing subsystem including one or more computing devices having memory, processing, and communication hardware. Controller 52 can be a single device or a distributed device, and functions of controller 52 can be performed by hardware and/or as computer instructions on a non-transient computer readable storage medium, such as non-transitory memory 54.

In certain embodiments, controller 52 includes one or more interpreters, determiners, evaluators, regulators, and/or processors 56 that functionally execute the operations of controller 52. The description herein including interpreters, determiners, evaluators, regulators, and/or processors emphasizes the structural independence of certain aspects of controller 52 and illustrates one grouping of operations and responsibilities of controller 52. Other groupings that execute similar overall operations are understood to be within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 52 include sensors, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, hard-wired logic circuits, reconfigurable logic circuits in a particular non-transient state configured according to a module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Referring back to FIG. 1, in one exemplary control method for system 10, controller 52 performs various operations that are described in more detail below. In general, controller 52 determines the voltages of battery packs 12A-12D and ranks the voltages in order of highest to lowest or lowest to highest. Controller 52 then controls the operation of IN-side switches 22A-22D and OUT-side switches 24A-24D to connect the IN-side of DC-DC converter 30 with the battery pack 12A-12D having the highest voltage ($V_{max}$) and to connect the OUT side of DC-DC converter 30 with the battery pack 12A-12D having the lowest voltage ($V_{min}$). Contactors 26 and 28 remain opened at this time. The battery pack 12A-12D having the $V_{max}$ voltage is used to charge the battery pack 12A-12D having the $V_{min}$ voltage through DC-DC converter 30. While this charging takes place, the voltages at IN terminal 34 and OUT terminal 36 change. Controller 52 monitors these voltages and when the voltage of one of the remaining battery packs 12A-12D (i.e., the battery packs 12A-12D with voltages between $V_{max}$ and $V_{min}$) is sufficiently close to the voltage at IN terminal 34 or OUT terminal 36, controller 52 controls operation of the appropriate IN-side switch 22A-22D or OUT-side switch 24A-24D to connect that battery pack 12A-12D to the appropriate one of IN terminal 34 or OUT terminal 36. This monitoring and connecting procedure is repeated until all battery packs 12A-12D are connected to either IN terminal 34 or OUT terminal 36. Controller 52 then operates DC-DC converter 30 until the voltage differences among battery packs 12A-12D are sufficiently small. As used herein, a voltage difference is "sufficiently small" when the magnitude of the voltage difference equals or is less than a predetermined voltage difference value. After that, controller 52 stops operation of DC-DC converter 30, opens all OUT-side switches 24A-24D, closes all IN-side switches 22A-22D, and closes positive contactor 26 and negative contactor 28. Controller 52 then operates DC-DC converter 30 to pre-charge the system DC bus 15. When pre-charging is complete, controller 52 opens all IN-side switches 22A-22D, closes all OUT-side switches 24A-24D, and connects all battery packs 12A-12D to system DC bus 15.

Figure 2A:
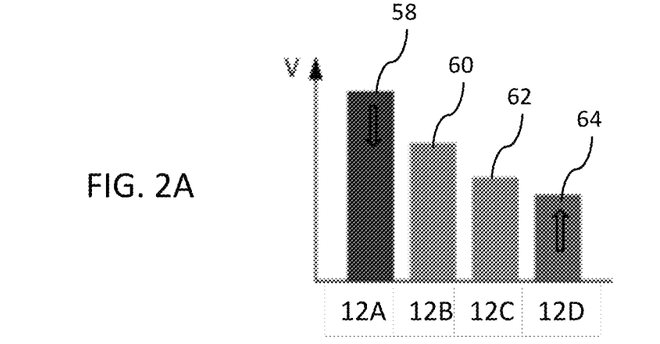
FIGS. 2A-D are graphs of the voltages of the battery packs of FIG. 1 at different stages of a balancing operation according to the present disclosure.
Figure 2B:
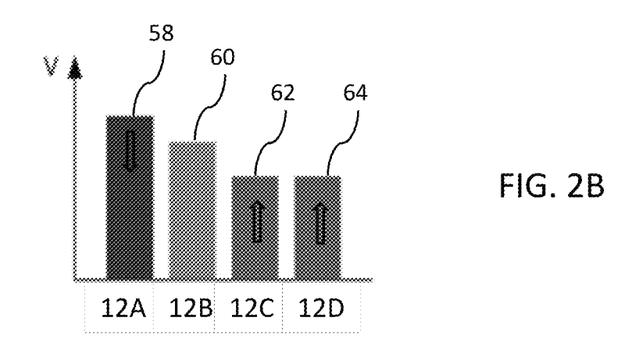

An example of the manner in which the voltages of battery packs 12A-12D change during operation of the above-described control method is depicted in FIGS. 2A-2D. As shown in FIG. 2A, in this example battery pack 12A is ranked by controller 52 as having the highest voltage 58 ($V_{max}$), battery pack 12B is ranked as having a lower voltage 60 than battery pack 12A, battery pack 12C is ranked as having a lower voltage 62 than battery pack 12B and battery pack 12D is ranked as having the lowest voltage 64 ($V_{min}$). After battery pack 12A ($V_{max}$) and battery pack 12D ($V_{min}$) are connected to IN terminal 34 and OUT terminal 36, respectively, battery pack 12A charges battery pack 12D through DC-DC converter 30. As indicated by the arrows in FIG. 2A, this reduces voltage 58 of battery pack 12A and increases voltage 64 of battery pack 12D. As depicted in FIG. 2B, voltage 64 of battery pack 12D eventually increases to a voltage that is sufficiently close to voltage 62 of battery pack 12C. As used herein, a voltage is "sufficiently close" to another voltage when the difference between the voltages equals or is less than the predetermined voltage difference value mentioned above. When controller 52 identifies this small voltage difference, it closes OUT-side switch 24C to connect positive terminal 18C of battery pack 12C to OUT terminal 36. At this point, energy is being transferred from pack 12A to both packs 12C and 12D, so voltage 58 continues to decrease and voltages 62 and 64 continue to increase as indicated by the arrows in FIG. 2B.

Figure 2C:
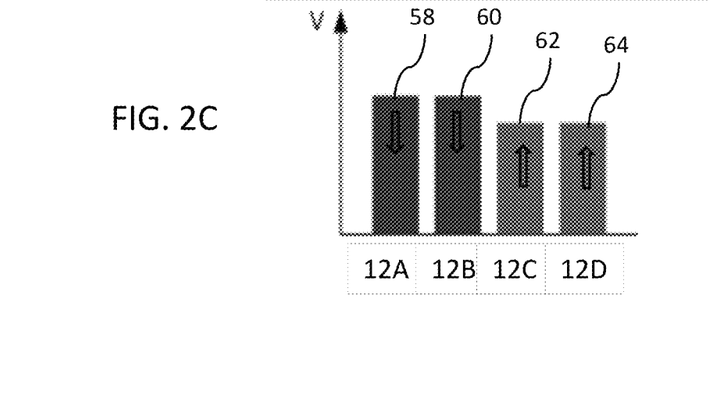
Figure 2D:
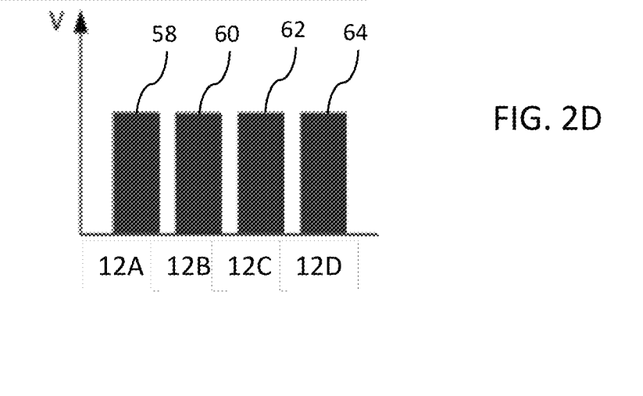

As depicted in FIG. 2C, as the voltage difference between OUT terminal 36 (with battery packs 12C and 12D connected) and IN terminal 34 (with battery pack 12A connected) becomes smaller, voltage 60 of battery pack 12B becomes sufficiently close to the voltage at IN terminal 34. When this occurs, controller 52 closes IN-side switch 22B to connect positive terminal 18B of battery pack 12B to IN terminal 34 of DC-DC converter 30. At this point, both voltages 58 and 60 continue to decrease and voltages 62, 64 continue to increase. Eventually, as depicted in FIG. 2D, the voltages at IN terminal 34 and OUT terminal 36 become balanced through operation of DC-DC converter 30 and controller 52 connects all of battery packs 12A-12D to IN terminal 34 by opening all OUT-side switches 24A-24D and closing all IN-side switches 22A-22D. Then, controller 52 closes contactors 26 and 28 for pre-charging system DC bus 15 using DC-DC converter 30.

Figure 3:
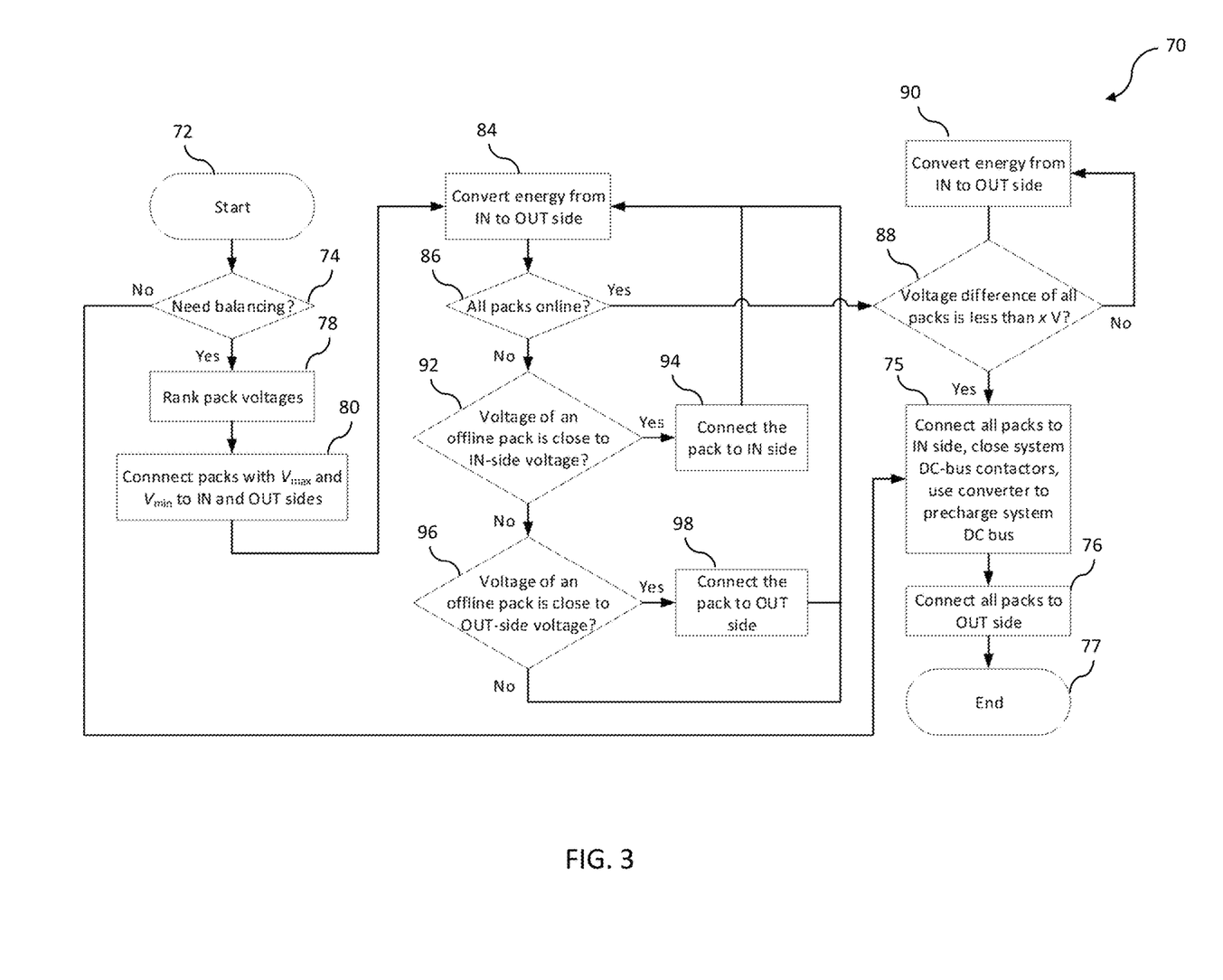
FIG. 3 is a flow chart of a method of balancing parallel battery pack voltages using the system of FIG. 1.

The above-described control method is depicted in flowchart form in FIG. 3. Control method 70 begins at block 72. At block 74, controller 52 determines the voltages of battery packs 12A-12D and compares the voltage differences to a predetermined voltage difference value to determine whether battery pack balancing is needed. If the voltages of battery packs 12A-12D are different by an amount that is less than the threshold voltage difference value, then no balancing is needed and control method 70 goes to block 75 and connects all packs 12A-12D to IN terminal 34, closes contactors 26 and 28, and uses DC-DC converter 30 to pre-charge system DC bus 15. When pre-charging is complete, control method 70 connects all packs 12A-12D to OUT terminal 36 at block 76 and ends at block 77. If controller 52 determines instead that battery packs 12A-12D need to be balanced, then controller 52 ranks the voltages of battery packs 12A-12D at block 78. At block 80 controller 52 identifies the battery pack(s) 12A-12D having the $V_{max}$ voltage and the battery pack(s) 12A-12D having the $V_{min}$ voltage, and connects them to IN terminal 34 and OUT terminal 36 of DC-DC converter 30, respectively. Controller 52 activates DC-DC converter 30 at block 84, thereby causing DC-DC converter 30 to convert energy from the battery pack(s) 12A-12D with $V_{max}$ to increase the voltage of battery pack(s) 12A-12D with $V_{min}$.

At block 86, controller 52 determines whether all battery packs 12A-12D have been connected to either IN terminal 34 or OUT terminal 36 of DC-DC converter 30. If they have, controller 52 determines at block 88 whether the differences between the voltages of battery packs 12A-12D are less than the threshold voltage difference value. If the voltage differences are less than the predetermined voltage difference value, then controller 52 may connect battery packs 12A-12D to IN terminal 34 at block 75. If, on the other hand, the voltages of battery packs 12A-12D are not sufficiently balanced, then controller 52 operates DC-DC converter 30 at block 90 to continue converting energy from the higher-voltage battery pack(s) to the lower voltage battery pack(s).

Eventually, the voltage differences among the battery packs 12A-12D will fall below the predetermined voltage difference value as determined by controller 52 at block 88, and control method 70 proceeds to block 75 as described above.

Returning to block 86, if controller 52 determines that fewer than all of battery packs 12A-12D are connected to IN terminal 34 or OUT terminal 36, then controller 52 determines at block 92 whether the voltage of a remaining off-line (i.e., not connected to either IN terminal 34 or OUT terminal 36 of DC-DC converter 30) battery pack 12A-12D is sufficiently close to the voltage at IN terminal 34. If a voltage of a battery pack 12A-12D is sufficiently close to the voltage at IN terminal 34, then controller 52 operates the appropriate IN-side switch 22A-22D at block 94 to connect the battery pack to IN terminal 34. Controller 52 then causes DC-DC converter 30 to balance the voltages between IN terminal 34 and OUT terminal 36 (at block 84) and determines (at block 86) whether all battery packs 12A-12D are connected to one of IN terminal 34 or OUT terminal 36. If, at block 92, no off-line battery pack 12A-12D has a voltage sufficiently close to the voltage of IN terminal 34, then controller 52 determines at block 96 whether any off-line battery pack 12A-12D has a voltage sufficiently close to the voltage of OUT terminal 36. If so, then controller 52 operates the appropriate OUT-side switch 24A-24D to connect positive terminal 18A-18D of the battery pack(s) 12A-12D to OUT terminal 36 at block 98. Then, the functions of the above-described blocks 84, 86, 92, 94 and 96 are repeated until controller 52 determines at block 86 that all battery packs 12A-12D are on-line (i.e., connected to one of IN terminal 34 or OUT terminal 36 of DC-DC converter 30). As described above, when all battery packs 12A-12D are on-line, controller 52 determines whether their voltage differences are less than the predetermined voltage difference value (at block 88). If the voltages are balanced, method 70 proceeds to block 75 as described above. If not, DC-DC converter 30 balances the voltages at block 90 until they are balanced.

Figure 4:
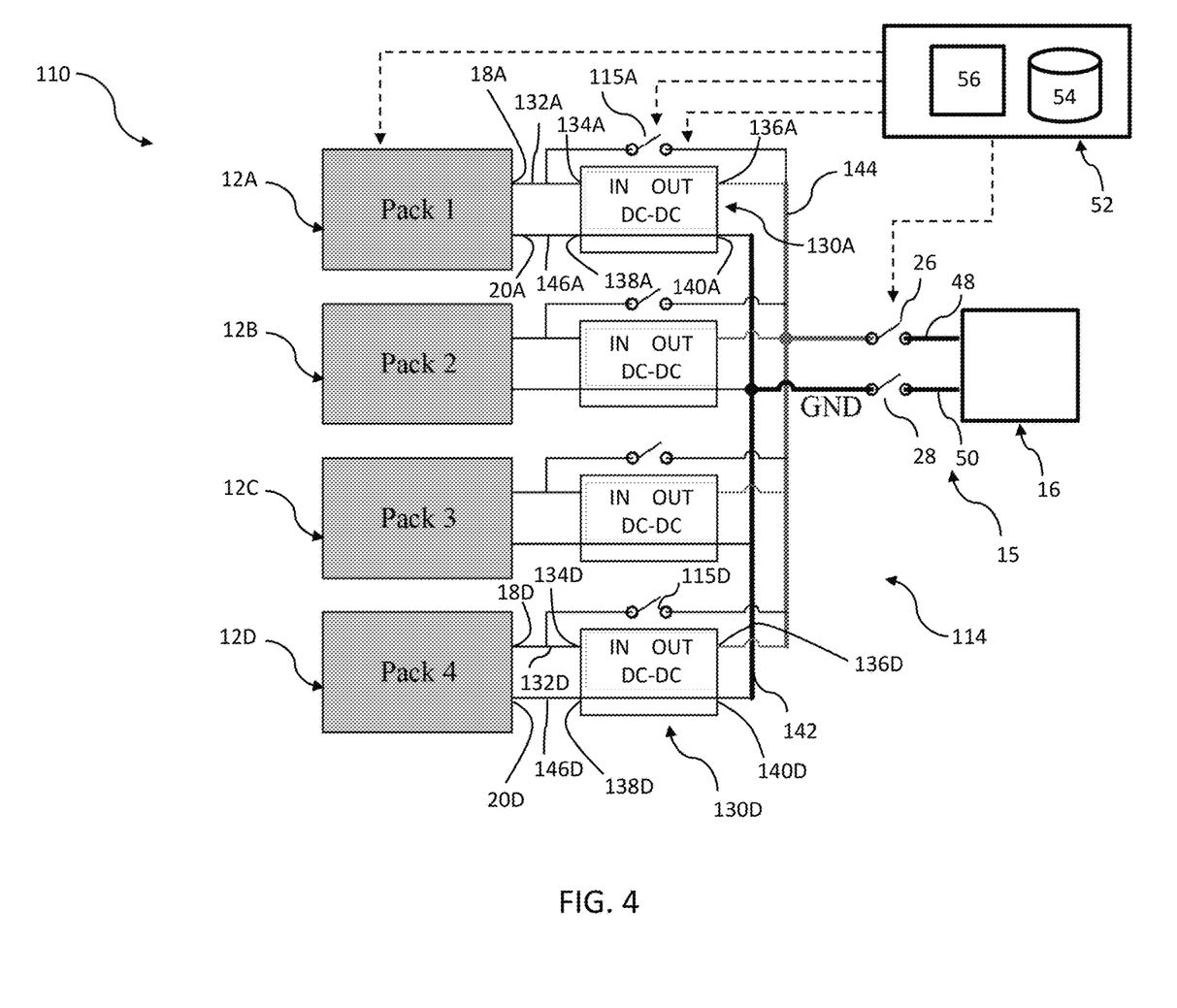
FIG. 4 is a schematic diagram of a parallel battery pack energy storage system with balancing circuitry according to another embodiment of the present disclosure.

Referring now to FIG. 4, another embodiment of an energy storage system according to the present disclosure is shown. System 110 is similar in various aspects to system 10 of FIG. 1, and like components will be identified using the same reference numerals. System 110 generally includes battery packs 12A-12D coupled to a balancing circuit 114, which in turn is coupled to system DC bus 15 and load 16. Again, while four battery packs 12A-12D are shown, it should be understood that more or fewer battery packs may be used for different applications. Each battery pack 12A-12D includes a positive terminal 18A-18D and a negative terminal 20A-20D.

Balancing circuit 114 includes a plurality of bypass switches 115A-115D, a positive system DC-bus contactor 26, a negative system DC-bus contactor 28 and a plurality of DC-DC converters 130A-130D, one for each battery pack 12A-12D. A terminal of bypass switch 115A is connected to positive terminal 18A of battery pack 12A through conductor 132A. Similarly, a terminal of bypass switch 115B is connected to positive terminal 18B of battery pack 12B through conductor 132B. Battery packs 12C and 12D are similarly connected to a terminal of bypass switches 115C and 115D through conductors 132C and 132D, respectively.

DC-DC converters 130A-130D may be any of a variety of suitable DC-DC converters known to those skilled in the art such as buck converters or buck-boost converters. As indicated above with reference to DC-DC converter 30, DC-DC converters 130A-130D include internal circuitry (not shown, but known in the art as potentially including power switches, diodes, inductors and capacitors), an IN terminal 134A-134D, an OUT terminal 136A-136D, a ground input 138A-138D and a ground output 140A-140D. Another terminal of each bypass switch 115A-115D is connected to OUT terminals 136A-136D of DC-DC converters 130A-130D through conductor 144. Positive terminals 18A-18D of battery packs 12A-12D are connected to IN terminals 134A-134D through conductors 132A-132D, respectively. Each negative terminal 20A-20D of battery packs 12A-12D is connected to a ground input 138A-138D of a corresponding DC-DC converter 130A-130D through a conductor 146A-146D. OUT terminals 136A-136D are connected to positive contactor 26 which (when closed) connects to positive conductor 48 of system DC bus 15. Ground outputs 140A-140D of DC-DC converters 130A-130D are connected through conductor 142 to negative contactor 28 which (when closed) connects to negative conductor 50 of system DC bus 15.

As indicated by dashed lines in FIG. 4, a controller 52 is in communication with battery packs 12A-12D, bypass switches 115A-115D, DC-DC converters 130A-130D, positive contactor 26 and negative contactor 28. In certain embodiments, controller 52 may be a battery management unit (BMU) or other similar device or system, and may include a non-transitory memory 54 having instructions that, in response to execution by a processor 56, cause processor 56 to determine voltages of battery packs 12A-12D and control the operation of bypass switches 115A-115D, DC-DC converters 130A-130D, positive contactor 26 and negative contactor 28 in the manner described herein.

Various alternatives, aspects and functions of processor 56, non-transitory memory 54, and controller 52 in system 110 are the same or similar to those described above with reference to FIG. 1, and are not repeated here.

Still referring to FIG. 4, in one exemplary control method for system 110, controller 52 performs various operations that are described in more detail below. In general, controller 52 determines the voltages of battery packs 12A-12D and ranks the voltages in order of highest to lowest or lowest to highest. Controller 52 also calculates an expected final balanced voltage ($V_{ave}$) of battery packs 12A-12D and designates battery packs 12A-12D having voltages that are greater than $V_{ave}$ as higher-voltage battery packs and battery packs 12A-12D having voltages that are less than $V_{ave}$ as lower-voltage battery packs. Controller 52 then controls the operation of bypass switches 115A-115D to connect the pack with the lowest voltage to its respective OUT terminal. Next, controller 52 operates converters 130A-130D corresponding to the higher-voltage packs to charge the OUT terminal. References in this description of the embodiment of FIGS. 4-6 to "the OUT terminal" as opposed to "system DC bus 15" are intended to refer to the common connection between OUT terminals 136A-136D of DC-DC converters 130A-130D or conductor 144. As the voltage at the OUT terminal (i.e., conductor 144) increases, controller 52 operates the appropriate bypass switches 115A-115D to connect the positive terminals 18A-18D of any lower voltage battery packs 12A-12D having voltages that are sufficiently close to the OUT terminal voltage to conductor 144. Also, when the voltage(s) of the higher-voltage battery pack(s) 12A-12D decrease(s) to $V_{ave}$, controller 52 stops operating the corresponding DC-DC converter(s) 130A-130D. The process of connecting lower-voltage battery packs 12A-12D to the OUT terminal as the OUT terminal voltage increases and discontinuing operation of DC-DC converters 130A-130D corresponding to higher-voltage battery packs 12A-12D with voltages that decrease to $V_{ave}$ is repeated until all lower-voltage battery packs 12A-12D are on-line (i.e., connected to the OUT terminal) and all higher-voltage battery packs 12A-12D reach $V_{ave}$. When voltages of packs are sufficiently close to each other, controller 52 opens all bypass switches 115A-115D, closes positive contactor 26 and negative contactor 28, then uses one of the DC-DC converters 130A-130D to pre-charge the system DC bus 15. When pre-charging is complete, positive terminals 18A-18D of all battery packs 12A-12D are connected (through operation of bypass switches 115A-115D) to system DC bus 15 and load 16.

Figure 5A:
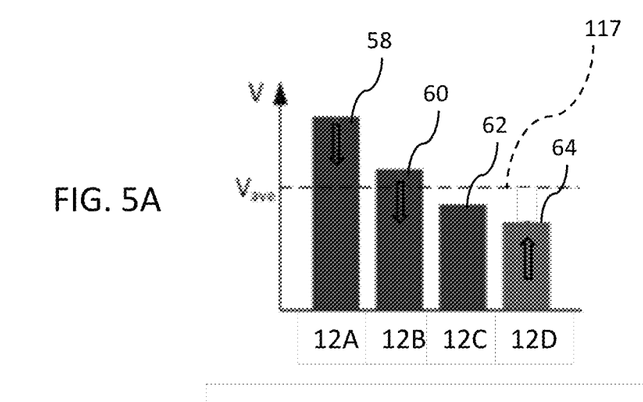
FIGS. 5A-D are graphs of the voltages of the battery packs of FIG. 4 at different stages of a balancing operation according to the present disclosure.

An example of the manner in which the voltages of battery packs 12A-12D change during operation of the above-described control method is depicted in FIGS. 5A-5D. As shown in FIG. 5A, in this example, battery pack 12A is ranked by controller 52 as having the highest voltage 58, battery pack 12B is ranked as having a lower voltage 60 than battery pack 12A, battery pack 12C is ranked as having a lower voltage 62 than battery pack 12B and battery pack 12D is ranked as having the lowest voltage 64. Controller 52 uses these voltages to determine $V_{ave}$, which is indicated by dashed line 117 in the figures. As voltage 58 of battery pack 12A and voltage 60 of battery pack 12B are greater than $V_{ave}$, controller 52 designates battery packs 12A and 12B as higher-voltage battery packs. Battery packs 12C and 12D are designated as lower-voltage battery packs because voltages 62 and 64 are lower than $V_{ave}$. Controller 52 then moves bypass switch 115D to a closed position to connect the pack with the lowest voltage (i.e., pack 12D) to conductor 144.

Figure 5B:
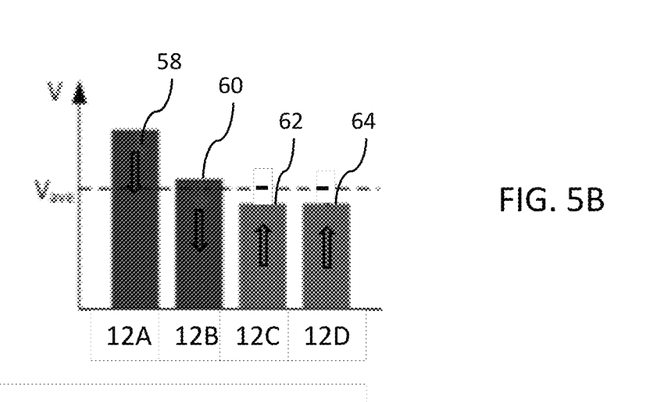

Next, controller 52 operates DC-DC converters 130A and 130B to charge the common OUT terminal (i.e., to increase the voltage at conductor 144). As shown in FIG. 5A, the voltages 58 and 60 of battery packs 12A and 12B continue to decrease toward $V_{ave}$. As the voltage of the OUT terminal increases, the voltage 64 of battery pack 12D continues to increase. Eventually the voltage 62 of battery pack 12C is sufficiently close to the OUT terminal voltage (the voltage 64 of battery pack 12D), and controller 52 closes bypass switch 115C to connect positive terminal 18C of battery pack 12C to conductor 144 as depicted in FIG. 5B. The voltages 62 and 64 of battery packs 12C and 12D, respectively, continue to increase toward $V_{ave}$ and the voltages 58 and 60 of battery packs 12C and 12D, respectively, continue to decrease toward $V_{ave}$ as indicated by the arrows in FIG. 5B.

Figure 5C:
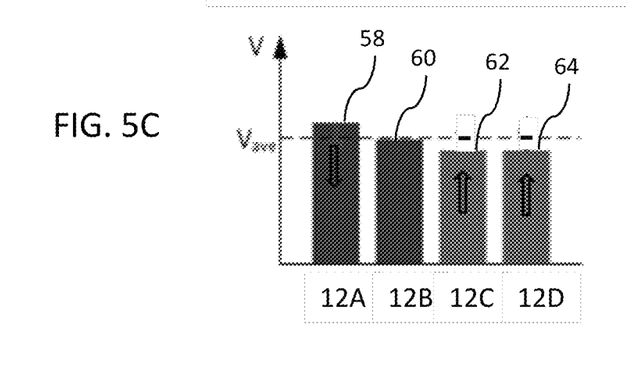
Figure 5D:
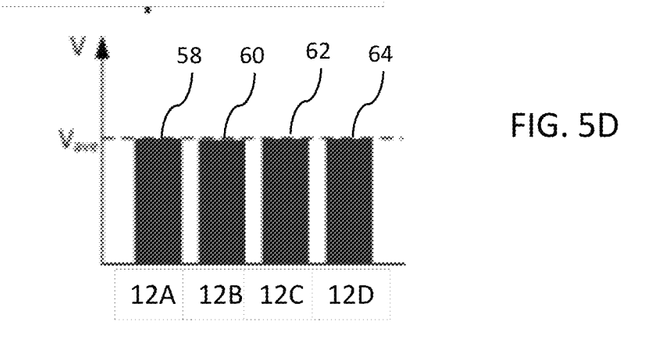

Referring now to FIG. 5C, the voltage 60 of battery pack 12B has decreased to $V_{ave}$ (or to a voltage that is sufficiently close to $V_{ave}$). Consequently, controller 52 stops operation of DC-DC converter 130B. In FIG. 5D, the voltage 58 of battery pack 12A has decreased to $V_{ave}$ and the voltages 62 and 64 of battery packs 12C and 12D, respectively, have increased to $V_{ave}$. When voltage 58 of battery pack 12A reaches $V_{ave}$, controller 52 discontinues operation of DC-DC converter 130A. Finally, after all voltages 58, 60, 62 and 64 have reached $V_{ave}$, controller 52 causes bypass switches 115C and 115D (corresponding to lower-voltage battery packs 12C and 12D, respectively) to open, and prepare for pre-charging system DC bus 15.

Figure 6:
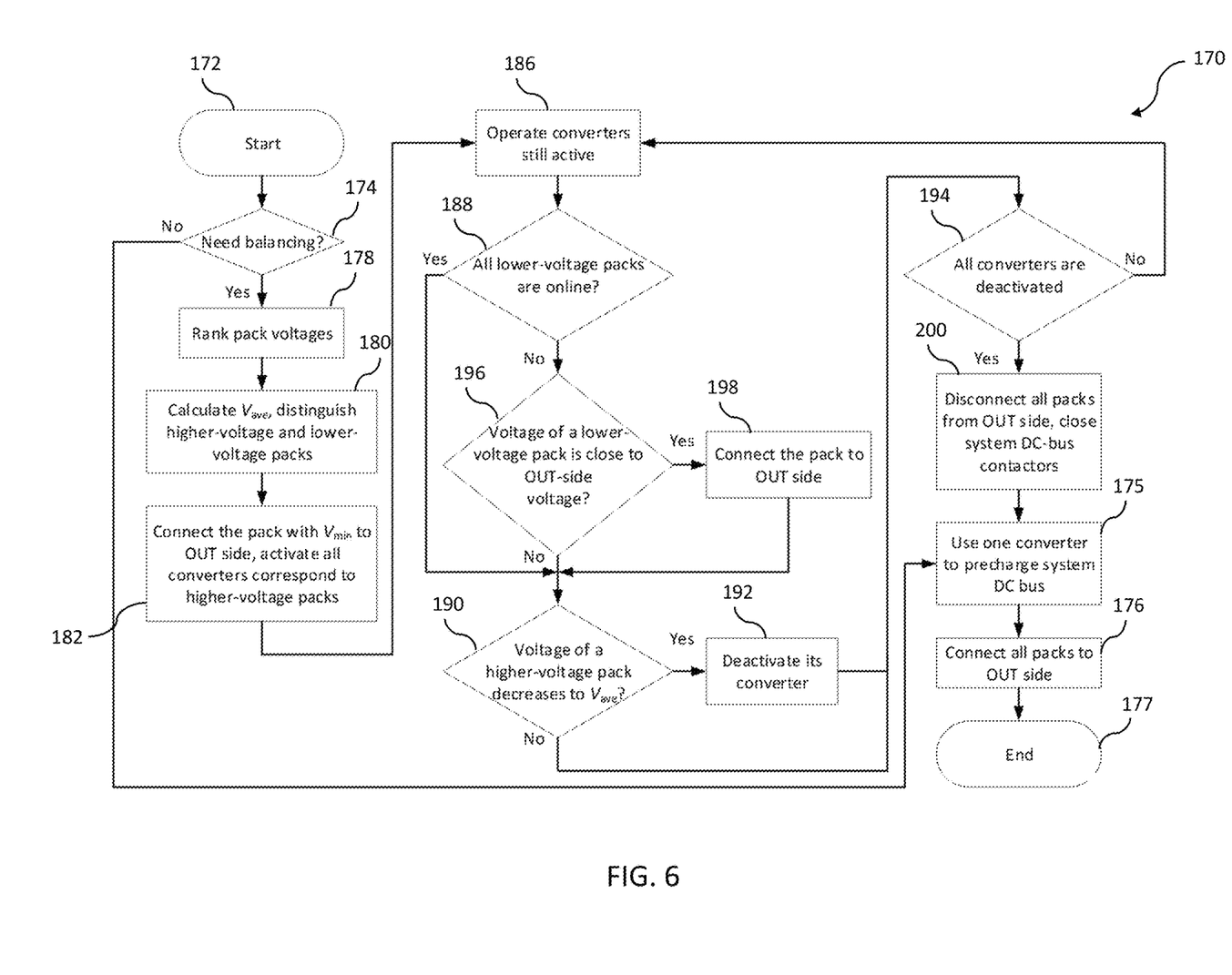
FIG. 6 is a flow chart of a method of balancing parallel battery pack voltages using the system of FIG. 4.

The above-described control method is depicted in flow-chart form in FIG. 6. Control method 170 begins at block 172. At block 174, controller 52 determines the voltages of battery packs 12A-12D and compares the voltage differences to a predetermined voltage difference value to determine whether battery pack balancing is needed. If the voltages of battery packs 12A-12D are different by an amount that is less than the predetermined voltage difference value, then no balancing is needed and control method 170 proceeds to block 175 and uses one of DC-DC converter 130A-130D to pre-charge system DC bus 15. Upon completion of pre-charging, controller 52 connects all packs 12A-12D to OUT terminal at block 176 and ends at block 177. If controller 52 determines instead that battery packs 12A-12D need to be balanced, then controller 52 ranks the voltages of battery packs 12A-12D at block 178. At block 180 controller 52 calculates the average of the voltages of battery packs 12A-12D ($V_{ave}$) and designates the higher-voltage battery packs and the lower-voltage battery packs in the manner described above. It should be understood that the "average" of the battery pack voltages is not intended to be limited to an arithmetic average of the voltages. In certain embodiments, the "average" is actually an estimated balanced voltage. All variations are meant to be encompassed by the term "average." Next, at block 182 controller 52 causes the bypass switch 115A-115D associated with the battery pack 12A-12D having the lowest voltage ($V_{min}$) to close, connecting that battery pack to the OUT terminal and activates DC-DC converters 130A-130D associated with higher-voltage battery packs 12A-12D. Those active DC-DC converters 130A-130D remain active at block 186.

At block 188 controller 52 determines whether all lower-voltage battery packs 12A-12D are on line (i.e., connected to the OUT terminal). If so, then controller 52 determines at block 190 whether a higher-voltage battery pack 12A-12D has decreased to $V_{ave}$. If a higher-voltage battery pack 12A-12D has reached $V_{ave}$, then controller 52 deactivates the associated DC-DC converter 130A-130D at block 192 and determines, at block 194, whether all DC-DC converters 130A-130D have been deactivated. If a higher-voltage battery pack 12A-12D has not reached $V_{ave}$ at block 190, then controller 52 determines at block 194 whether all DC-DC converters 130A-130D have been deactivated. In either case, if not all DC-DC converters 130A-130D have been deactivated as determined by controller 52 at block 194, then the currently active DC-DC converters 130A-130D remain active at block 186 and controller 52 determines at block 188 whether all lower-voltage battery packs 12A-12D are online (i.e. connected to the OUT terminal). If not all lower-voltage battery packs 12A-12D are on-line, then at block 196 controller 52 determines whether the voltage of an off-line lower-voltage battery pack 12A-12D is sufficiently close to the OUT terminal voltage. If not, then controller 52 checks for higher-voltage battery packs 12A-12D with voltages at $V_{ave}$ at block 190 and repeats the process discussed above. If controller 52 determines at block 196 that the voltage of an off-line battery pack 12A-12D is sufficiently close to the OUT terminal voltage, then controller 52 connects the battery pack 12A-12D to the OUT terminal at block 198 and performs the functions represented by blocks 190, 192 and 194 as described above. Finally, at block 194 when controller 52 determines that all DC-DC converters 130A-130D are deactivated, controller 52 moves the bypass switches 115A-115D of all lower-voltage battery packs 12A-12D to the open position at block 200 to disconnect positive terminals 18A-18D of those battery packs from the OUT terminal, closes system DC-bus contactors 26 and 28, and control method 170 proceeds to block 175 as described above.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A balancing circuit for actively balancing voltages of battery packs to be connected in parallel, the balancing circuit comprising:
   IN-side switches;
   OUT-side switches;
   a direct current-direct current (DC-DC) converter having an IN terminal connected to the IN-side switches and an OUT terminal connected to the OUT-side switches; and
   a controller configured to operate an IN-side switch to connect a $V_{max}$ battery pack having a highest voltage of the battery packs to the IN terminal, operate an OUT-side switch to connect a $V_{min}$ battery pack having a lowest voltage of the battery packs to the OUT terminal, and activate the DC-DC converter to transfer energy from the $V_{max}$ battery pack to the $V_{min}$ battery pack;

wherein the controller is further configured to
respond to an IN terminal voltage being sufficiently close to a voltage of a first battery pack by operating the IN-side switch to connect the first battery pack to the IN terminal, and
respond to an OUT terminal voltage being sufficiently close to a voltage of a second battery pack by operating the OUT-side switch to connect the second battery pack to the OUT terminal.

2. The balancing circuit of claim 1, wherein, when all of the battery packs are connected to the DC-DC converter, the controller is configured to respond to a voltage difference among the battery packs being sufficiently small by stopping operation of the DC-DC converter.

3. The balancing circuit of claim 2, wherein the controller is further configured to respond to a voltage difference among the battery packs being sufficiently small by opening the OUT-side switches and closing the IN-side switches to connect the battery packs to the IN terminal, closing one or more contractors of a system DC bus, operating the DC-DC converter to pre-charge the system DC bus, discontinue operating the DC-DC converter, and connecting the battery packs to the system DC bus.

4. The balancing circuit of claim 1, wherein the DC-DC converter is one of a buck converter or a buck-boost converter.

5. The balancing circuit of claim 1, wherein the controller is configured to rank voltages of the battery packs from a highest voltage to a lowest voltage or from a lowest voltage to a highest voltage.

6. A method of pre-charging a system direct current (DC) bus coupled to a plurality of battery packs to be connected in parallel, the method comprising:
ranking the plurality of battery packs in order of voltage;
connecting a first battery pack with a highest voltage to an IN terminal of a DC-DC converter;
connecting a second battery pack with a lowest voltage to an OUT terminal of the DC-DC converter;
converting an energy from the first battery pack to the second battery pack through the DC-DC converter,
connecting a third battery pack to the IN terminal in response to a voltage of the third battery pack being within a first threshold voltage difference of a voltage of the IN terminal;
connecting a fourth battery pack to the OUT terminal in response to a voltage of the fourth battery pack being within a second threshold voltage difference of a voltage of the OUT terminal; and
when the voltages of all of the battery packs are within a third threshold voltage difference of one another, connecting all of the battery packs to the IN terminal and connecting the OUT terminal to the system DC bus to pre-charge the system DC bus.

7. The method of claim 6, wherein the connecting of the first battery pack with a highest voltage to the IN terminal of a DC-DC converter includes operating a controller to close an IN-side switch connected between the first battery pack and the IN terminal.

8. The method of claim 6, wherein the connecting of the second battery pack with a lowest voltage to the OUT terminal of the DC-DC converter includes operating a controller to close an OUT-side switch connected between the second battery pack and the OUT terminal.

9. An energy storage system, comprising:
a plurality of battery packs to be connected in parallel;
a balancing circuit coupled to the plurality of battery packs; and
a pair of contactors coupled to the balancing circuit to connect the plurality of battery packs to a system direct current (DC) bus;
wherein the balancing circuit includes
a DC-DC converter having an IN terminal and an OUT terminal,
a plurality of IN-side switches connected between the plurality of battery packs and the IN terminal,
a plurality of OUT-side switches connected between the plurality of battery packs and the OUT terminal, and
a controller having a memory with instructions that, when executed, cause the controller to
control the IN-side switches and the OUT-side switches to connect a battery pack of the plurality of battery packs having a highest voltage to the IN terminal,
connect a battery pack of the plurality of battery packs having a lowest voltage to the OUT terminal,
connect any remaining battery pack of the plurality of battery packs to the IN terminal in response to a voltage of said remaining battery pack being sufficiently close to a voltage of the IN terminal, and
connect the any remaining battery pack to the OUT terminal in response to a voltage of said remaining battery pack being sufficiently close to a voltage of the OUT terminal.

10. The energy storage system of claim 9, wherein the controller is further configured to respond to the voltages of the plurality of battery packs being balanced through operation of the DC-DC converter by connecting the plurality of battery packs to the IN terminal, closing system DC-bus contactors, and using the DC-DC converter to pre-charge a system DC bus.

11. The energy storage system of claim 9, wherein the DC-DC converter is one of a buck converter or a buck-boost converter.

12. The energy storage system of claim 9, wherein the controller is configured to rank voltages of the battery packs from a highest voltage to a lowest voltage or from a lowest voltage to a highest voltage.

13. A balancing circuit for actively balancing voltages of a plurality of battery packs to be connected in parallel, the balancing circuit comprising:
a plurality of direct current-direct current (DC-DC) converters corresponding to the plurality of battery packs, each DC-DC converter having an IN terminal and an OUT terminal;
a plurality of bypass switches, each bypass switch connected between an IN terminal and an OUT terminal of a respective one of the plurality of DC-DC converters; and
a controller configured to
connect a battery pack of the plurality of battery packs having a lowest voltage to the OUT terminal,
operate one or more DC-DC converters of the plurality of DC-DC converters corresponding to one or more higher-voltage battery packs of the plurality of battery packs having initial voltages greater than an average battery pack voltage ($V_{ave}$) to charge the OUT terminal, connect one or more lower-voltage battery packs of the plurality of battery packs having initial voltages less than $V_{ave}$ to the OUT terminal when an initial voltage of a lower-voltage battery pack of one or more lower-voltage battery packs is sufficiently close to a current voltage of the OUT terminal, and deactivate a DC-DC converter corresponding to a higher-voltage battery pack of one or more higher-voltage battery packs when a current voltage of the corresponding higher-voltage battery pack is sufficiently close to $V_{ave}$.

14. The balancing circuit of claim 13, wherein the controller is further configured to respond to all lower-voltage battery packs being connected to the OUT terminal and all higher-voltage battery packs being sufficiently close to $V_{ave}$ by disconnecting all battery packs from the OUT terminal, closing contactors of a system DC-bus, and pre-charging the system DC bus with each DC-DC converter of said one or more DC-DC converters.

15. The balancing circuit of claim 14, wherein the controller is further configured to respond to completion of pre-charging the system DC bus by discontinuing operation of said each DC-DC converter, and connecting all of the battery packs to the system DC bus through the plurality of bypass switches.

16. A method of pre-charging a system direct current (DC) bus coupled through a DC bus contactor to a plurality of battery packs to be connected in parallel, the method comprising:

ranking the plurality of battery packs in order of voltage;
calculating an average battery pack voltage;
identifying higher-voltage battery packs as battery packs of the plurality of battery packs having initial voltages that are greater than the average battery pack voltage;
identifying lower-voltage battery packs as battery packs of the plurality of battery packs having initial voltages that are less than the average battery pack voltage;
connecting a first battery pack with a lowest voltage to the DC bus contactor;
activating DC-DC converters connected to the higher-voltage battery packs to provide energy to the DC bus contactor and increase the voltage of the first battery pack;
connecting at least one lower-voltage battery pack to the DC bus contactor when an initial voltage of the at least one lower-voltage battery pack is sufficiently close to a current voltage of the DC bus contactor; and deactivating at least one DC-DC converter connected to a higher-voltage battery pack when a current voltage of the higher-voltage battery pack is sufficiently close to the current voltage of the DC bus contactor.

17. The method of claim 16, further comprising disconnecting all of the plurality of battery packs from the DC bus contactor, connecting the DC bus contactor to a load and activating a DC-DC converter connected to one of the plurality of battery packs to pre-charge a system DC bus.

18. An energy storage system, comprising:
a plurality of battery packs to be connected in parallel; and
a balancing circuit coupled to the plurality of battery packs including a plurality of current-direct current (DC-DC) converters corresponding to the plurality of battery packs,
wherein each DC-DC converter has an IN terminal and an OUT terminal, a plurality of bypass switches, each bypass switch connected between an IN terminal and an OUT terminal of a DC-DC converter, and a controller having a memory with instructions that, when executed, cause the controller to control the plurality of bypass switches to connect a battery pack having a lowest voltage to the OUT terminal of the DC-DC converter associated with said battery pack, operate DC-DC converters associated with higher-voltage battery packs having initial voltages greater than an average battery pack voltage ($V_{ave}$) to charge the OUT terminal, connect lower-voltage battery packs having initial voltages less than $V_{ave}$ to the OUT terminal when the initial voltage of a lower-voltage battery pack is sufficiently close to a current voltage of the OUT terminal, and when a current voltage of a higher-voltage battery pack is sufficiently close to $V_{ave}$, deactivate a DC-DC converter corresponding to the higher voltage battery pack.

19. The energy storage system of claim 18, wherein the controller is further configured to respond to all lower-voltage battery packs being connected to the OUT terminal and the voltages of all higher-voltage battery packs being sufficiently close to $V_{ave}$ by disconnecting all battery packs from the OUT terminal, closing contactors of a system DC bus, and pre-charging the system DC bus with one of the DC-DC converters.

20. The energy storage system of claim 19, wherein the controller is further configured to deactivate the one of the DC-DC converters, and connect all battery packs to the system DC bus through the bypass switches.

* * * * *